United States Patent [19]

Dent

[11] Patent Number: 5,425,049
[45] Date of Patent: Jun. 13, 1995

[54] STAGGERED FREQUENCY HOPPING CELLULAR RADIO SYSTEM

[75] Inventor: Paul W. Dent, Stehags, Sweden

[73] Assignee: Ericsson GE Mobile Communications Inc., Research Triangle Park, N.C.

[21] Appl. No.: 140,468

[22] Filed: Oct. 25, 1993

[51] Int. Cl.⁶ .................................................. H04L 1/10
[52] U.S. Cl. .................................... 375/202; 380/34; 370/95.1
[58] Field of Search .................. 375/1; 370/95.1, 95.3; 380/34

[56] References Cited

U.S. PATENT DOCUMENTS

| 4,320,514 | 3/1982 | Haskell | 375/1 |
|---|---|---|---|
| 4,454,604 | 6/1984 | Myers | 375/1 |
| 4,476,566 | 10/1984 | Dent | 375/1 |
| 4,532,636 | 7/1985 | Wilkinson | 375/1 |
| 4,554,668 | 11/1985 | Deman et al. | 375/1 |
| 4,558,453 | 12/1985 | Mimken | 375/1 |
| 4,677,617 | 6/1987 | O'Connor et al. | 370/100 |
| 4,752,939 | 6/1988 | Amoroso et al. | 375/1 |
| 4,827,507 | 5/1989 | Marry et al. | 380/38 |
| 4,850,036 | 7/1989 | Smith | 455/179 |
| 4,870,248 | 2/1989 | Pyatt et al. | 375/1 |
| 5,020,056 | 5/1991 | Chennakeshu | 370/95.3 |
| 5,287,384 | 2/1994 | Avery et al. | 275/1 |
| 5,291,475 | 3/1994 | Bruckert | 375/1 |

FOREIGN PATENT DOCUMENTS 329997 8/1989 European Pat. Off. .
2132450 7/1984 United Kingdom .
WO91/13502 9/1991 WIPO .

OTHER PUBLICATIONS

Jean-Louis Dornstetter et al., "Cellular Efficiency with Slow Frequency Hopping: Analysis of the Digital SFH900 Mobile System", IEEE Journal on Selected Areas in Communications, vol. SAC-5, No. 5, pp. 835–848 (1987).

Didier Verhulst et al., "High Performance Cellular Planning with Frequency Hopping", Article, pp. 1–8.

Didier Verhulst et al., "Slow Frequency Hopping Multiple Access for Digital Cellular Radiotelephone", IEEE Journal on Selected Areas in Communications, vol. SAC-2, No. 4 pp. 563–574 (1984).

Primary Examiner—David C. Cain
Attorney, Agent, or Firm—Burns, Doane, Swecker & Mathis

[57] ABSTRACT

A communication system having a frequency hopping scheme which provides increased interferer diversity without increased system delay is disclosed. The frequency hopping scheme includes providing a staggered offset period between hops of neighboring or adjacent base stations so as to create additional interference situations (diversity).

26 Claims, 6 Drawing Sheets

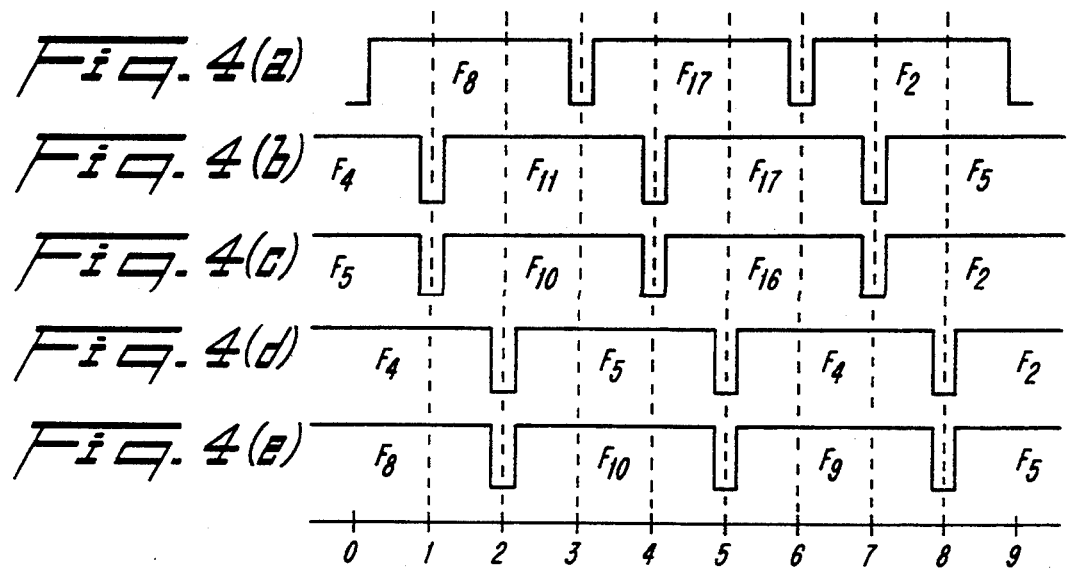
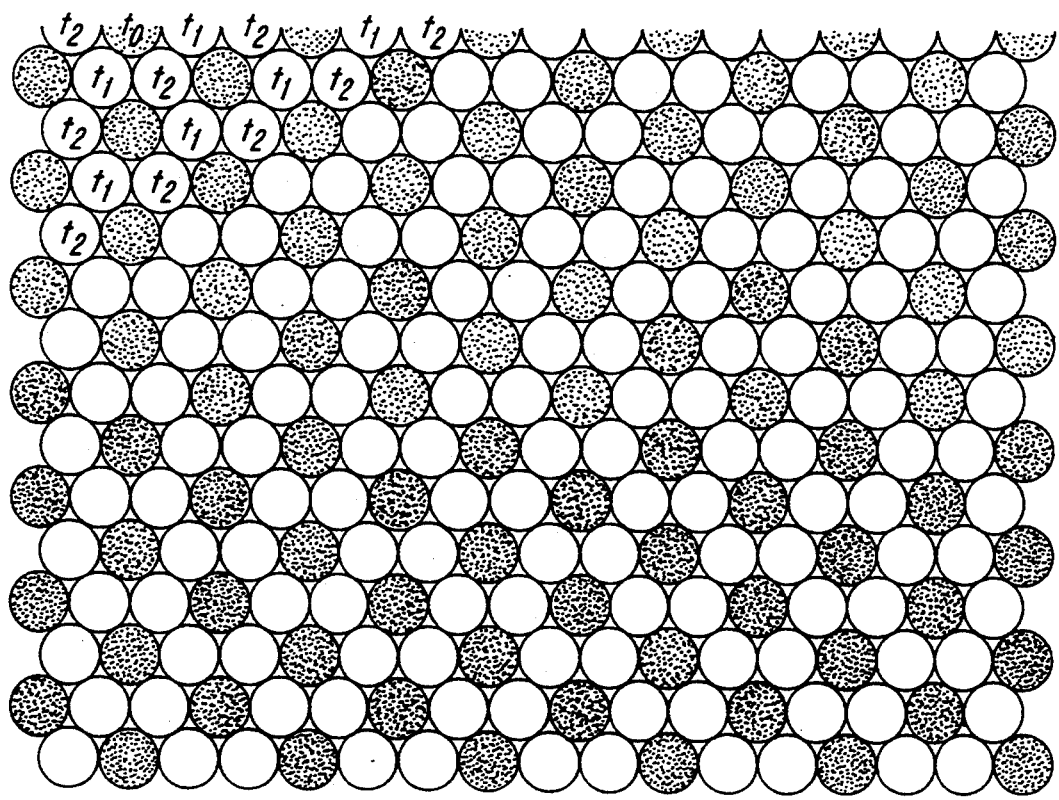

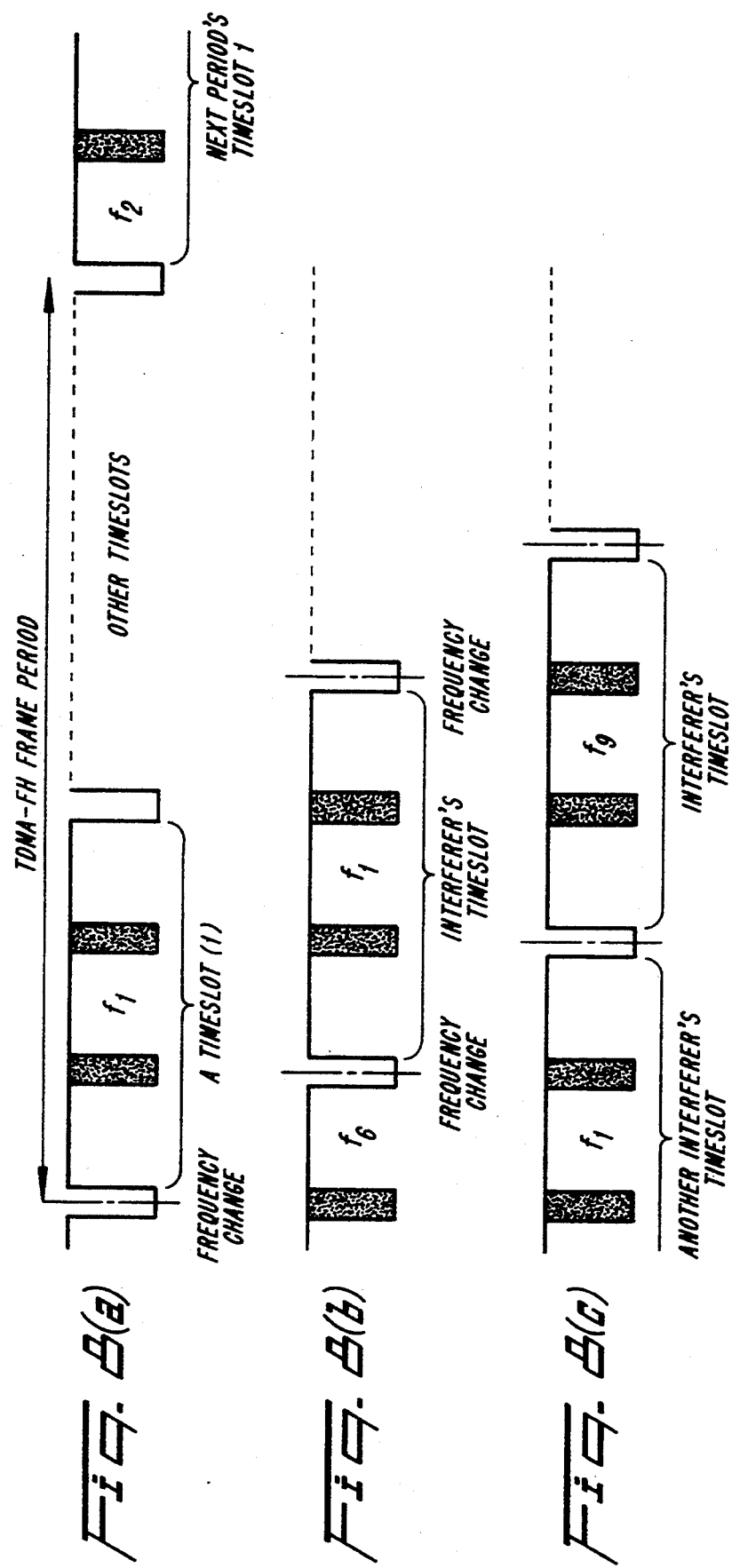

STAGGERED FREQUENCY HOPPING CELLULAR RADIO SYSTEM

BACKGROUND

The present invention generally relates to cellular mobile radio communication. More specifically, the invention relates to methods and systems for efficient and flexible use of the frequency spectrum available for communication in a frequency division multiple access (FDMA) or a time division multiple access (TDMA) mobile radio communication system. The present invention also relates to base stations and mobile stations for flexible and efficient use of the frequency spectrum available in such communication systems.

Many mobile radio telephone systems of various kinds are known and in use. In all of these systems, the frequency band available for connections limits the number of possible simultaneous connections, or capacity, of the system. Two base stations or mobile stations transmitting on the same radio channel of an FDMA system or on the same time slot of the same radio channel in a TDMA system may interfere with each other. This kind of interference is sometimes called co-channel interference because the interference comes from the same radio channel. If the signal strength of the signals relating to one of the connections is not sufficiently strong relative to the strength of the interfering signals, the information on the first connection will then be more or less unintelligible. If the interfering mobiles or base stations are sufficiently distant from each other, however, the signals relating to the connection will be sufficiently stronger than the interference signals and the information of the connections will be received and properly decoded.

In order to be able to use the same radio channel in FDMA systems, or the same time slot of a radio channel in TDMA systems, for more than one connection, some mobile radio systems are set up as cellular systems. The geographical area to be covered by such a system is divided into smaller areas, called cells, and mobiles in a cell communicate with a base station for that cell. Some or all of the available radio channels are distributed among the cells according to a frequency plan.

A conventional frequency plan provides that different radio channels are allotted to a cluster of adjacent or neighboring cells. No two cells in the same cluster can use the same radio channel at the same time. Each radio channel used by the base station or a mobile station of one cell in a cluster, is different from every channel used by a base or mobile in another cell in the same cluster. However, cells in different clusters may use the same radio channels. Thus there can be simultaneous multiple use of a radio channel. Such multiple use is sometimes called channel or frequency m-use. The distance between cells using the same radio channel is known as the m-use distance.

Many different shapes and sizes of cell clusters are known to those skilled in the art, e.g. 3-cell, 4-cell, 9-cell, 12-cell and 21-cell clusters. Somewhat simplified, the largest call handling capacity for a cellular system is achieved when using the smallest type of cluster that provides sufficiently low co-channel interference.

Although the frequency plans described above provide the important advantage of plural use of radio channels, such fixed frequency plans are cumbersome to implement. Due to geographical variations, the cells covered by each base station antenna will vary in size and shape. The coverage area of the system will thus normally be covered by several different combinations of the known cluster combinations. Commonly, the cluster configuration, or decisions of which re-use patterns to be used, are made using complex computer simulations of the topography in the system.

Other disadvantages are also inherent in the use of fixed frequency plans. Normally, the number of desired connections in a cell varies with time and one cell may not be able to handle all desired connections because all of the channels and all of the time slots on TDMA channels allotted to the cell are occupied. At the same time the number of desired connections in an adjacent cell, or any cell in the same cluster, may be substantially less than the total capacity on all channels allotted to that cell according to the fixed frequency plan. Thus all desired connections cannot be handled by the cell cluster despite the fact that there is at least one free channel or at least a free time slot on a radio channel which could have been used for the desired connections had this not been forbidden by the fixed frequency plan.

One way of reducing the above mentioned disadvantage of fixed frequency plans is to distribute some of the radio channels available for connections in a mobile radio communication system, and to keep some radio channels in reserve. All of the channels except for the reserved channels are distributed according to a frequency plan. The reserved radio channels may be temporarily used by any cell requiring additional capacity above that provided by the channels permanently allotted to that cell in accordance with the frequency plan. Such temporary use of a reserved channel is subject to not causing co-channel interference with a connection in another cell already using that reserved radio channel. While this method of reserving and temporary allotting some radio channels provides more flexibility as regards variable connection handling capacity than a fixed frequency plan, the total handling capacity for the whole system may decrease.

A more profound method of obtaining high traffic handling flexibility in various areas of a cellular mobile radio system is to completely abolish the fixed frequency plan in favor of letting all radio channels be available for connections in all cells. Any cell may use any radio channel available for connections, provided there is sufficiently low co-channel interference from other cells currently using the same radio channel. This method of using the available radio channels is sometimes called dynamic channel allocation (DCA). While this method certainly affords advantages as regards changing call handling capacity for a cell, it also includes disadvantages. For example, DCA is relatively complex since it requires many quality measurements made by mobile stations that are reported to base stations. Moreover, DCA also involves frequent handovers.

In conventional FDMA or TDMA systems where the same radio channel is used throughout a connection, any co-channel interference will last as long as both the connections last when the transmissions occur more or less simultaneously on the same radio channel. Thus, a worst case situation must be considered in frequency planning and cell cluster design to ensure that the minimum acceptable signal quality is maintained. Frequency hopping is a technique for ensuring that worst case interference scenarios do not prevail for longer than one frequency hop interval as opposed to the duration of the entire connection.

In a frequency hopping system each cell can use all of the available channels, but at different times, as determined by a pseudo-random frequency hop sequence generator. Such generators can be constructed either to yield a random probability that any two cells choose the same frequency at the same time (known as non-orthogonal hopping), or to guarantee that specified cells or mobile stations never choose the same frequency at the same time (known as orthogonal hopping) or a mixture of the two techniques (e.g., signals in the same cell hop orthogonally, while being non-orthogonal relative to adjacent cell signals). Today there is only one commercial example of a frequency hopping cellular radio system. The European GSM standard describes this system, which is based on a combination of time division multiple access (TDMA) in which a 4.6 mS time cycle on each frequency channel is divided into eight, 560 $\mu$S time slots occupied by different users, and frequency hopping in which the frequency of all eight time slots changes every 4.6 mS.

There are, however, several drawbacks associated with frequency hopping systems, in general, and the GSM standard in particular. For example, the occasional loss of data in a frequency hopping system can be ameliorated by providing redundant information bits which the demodulator in a receiver can use to recover correct information. Typically, this is accomplished in frequency hopping systems which provide error correction coding that spreads redundant information bits over a number of frequency hops by interleaving. Such systems work best when data is interleaved over many hops rather than just a few hops, but an undesirable side-effect of interleaving is a corresponding increase in transmission delay.

Along the same lines, it has been recognized to be advantageous in frequency hopping systems, such as GSM, that adjacent base stations have their TDMA frame structures, and therefore their frequency hopping instants, synchronized, as this facilitates the handover of communication with a mobile station from one base station to another base station as the mobile station crosses the boundary between their coverage zones. If adjacent stations are not synchronized, then the mobile station must somehow obtain knowledge of the timing of the new base station, ideally before relinquishing contact with the original base station, a task which is technically difficult to implement.

Moreover, requiring synchronization between adjacent base stations necessitates synchronization of an entire, nationwide network and there are difficulties in coordinating this when the stations even within a single country are owned by a multiplicity of competing service providers. Therefore, the GSM standard does not specify synchronized base stations and individual network operators can, for example, choose to synchronize the stations within their own network while being unsynchronized in other networks.

SUMMARY

These and other drawbacks of conventional cellular communication systems are overcome by systems and methods according to the present invention. Various exemplary embodiments of the present invention provide an effective increased amount of interleaving to increase effective interferer diversity by using synchronized, offset frequency hopping between neighboring base stations. Moreover, this increase in effective interleaving is achieved without increasing transmission delay.

BRIEF DESCRIPTION OF THE DRAWINGS

These and other features, objects, and advantages of the present invention will become more readily apparent to those skilled in the art by reading the following detailed description in conjunction with the appended figures in which:

FIGS. 4(a)-4(e) illustrate frequency hopping communication transmissions of mobile stations according to an exemplary embodiment of the present invention;

FIG. 5 illustrates a 3-cell timing stagger reuse pattern according; to an exemplary embodiment;

FIGS. 8(a)-8(c) illustrate communication patterns according to an exemplary TDMA embodiment.

DETAILED DESCRIPTION

Figure 1:
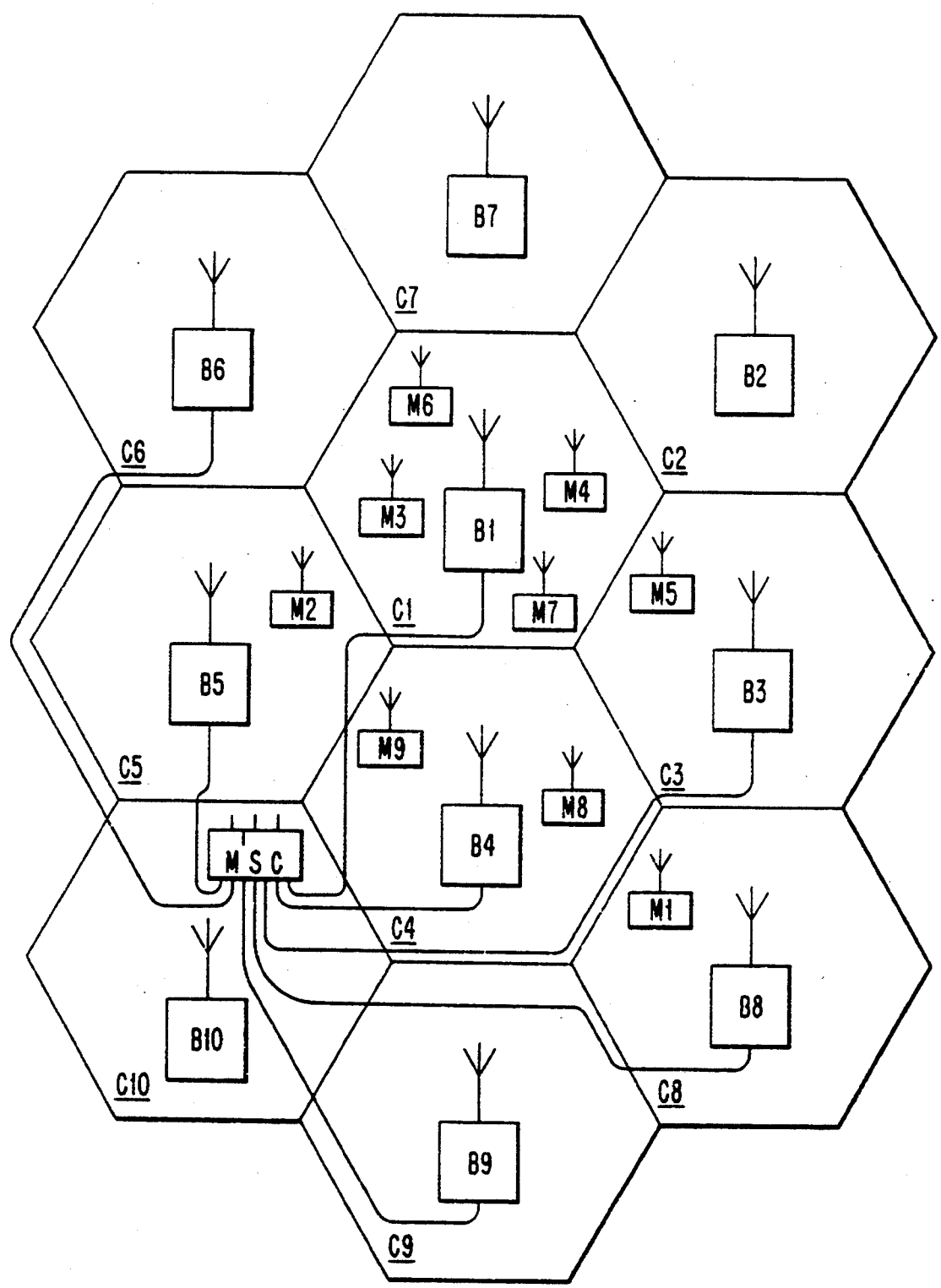
FIG. 1 illustrates an exemplary cellular system layout.

FIG. 1 illustrates ten cells C1 to C10 in an exemplary cellular mobile radio system. For each cell C1 to C10 there is a corresponding base station, denoted B1 to B10. The base stations are situated in the center of the cells and have omnidirectional antennas. Ten mobile stations, M1-M10, are also shown. They may be automobile installed and powered by the vehicle's electric power system, or small, lightweight, battery-powered handportable stations. The mobile stations are moveable within a cell and from one cell to another. A mobile switching center, abbreviated MSC, is connected to all the base stations by cables or any other fixed means, such as a radio or optical link. Some of these cables are omitted in FIG. 1 for simplicity. The MSC is also connected by cables or links to a fixed public telephone network or a similar fixed communication network.

During operation the mobile stations will be in contact with the fixed part of the system by transmission of radio signals to, and reception of radio signals from, the different base stations. Telephone calls, data communication links or other communication paths can be set up between one mobile station and another mobile station in the system. Calls can also be set up to mobiles in another system or subscribers in the fixed network. For the purposes of this discussion, all of these situations are all called connections irrespective of whether they originate in a mobile station or end in a mobile station.

The exemplary system of FIG. 1 is, of course, a simplification as normally the system will comprise more cells and base stations. There can, for example, be umbrella cells each covering an area also covered by a group of micro cells. Also the number of mobile stations will normally be much larger. Base stations located in the vicinity of the cell borders and with sector antennas are also common. Some cells may be served by more than one base station. Several other MSCs with connected base stations will also normally exist and the mobile stations are usually also free to communicate via these other MSCs.

First, an exemplary Frequency Division Multiple Access (FDMA) system in which the present invention can be implemented will be described. In FDMA systems mobile stations within a cell do not use the same frequency at the same time, but instead are guaranteed a unique frequency at a particular time within the cell. Mobile stations in other cells can use the same frequency and so are a potential source of interference. In fixed frequency (i.e., non-hopping) systems, an interference situation that arises can last for the entire duration of a telephone call and therefore the design of the system must tolerate such worst cases. In a frequency hopping system, however, the mobile stations' frequencies are not fixed and are systematically varied according to more or less random patterns, but with the property that the random patterns used within a single cell do not result in the same frequency being used simultaneously by two or more mobiles. Such patterns or sequences are known as orthogonal. A method of producing apparently random sequences that have this orthogonal property is described in U.S. Pat. No. 4,476,566, entitled "Frequency Hopping Radio Communication Apparatus Having Pseudo-Random Channel Selection", which is hereby incorporated by reference.

Figure 2:
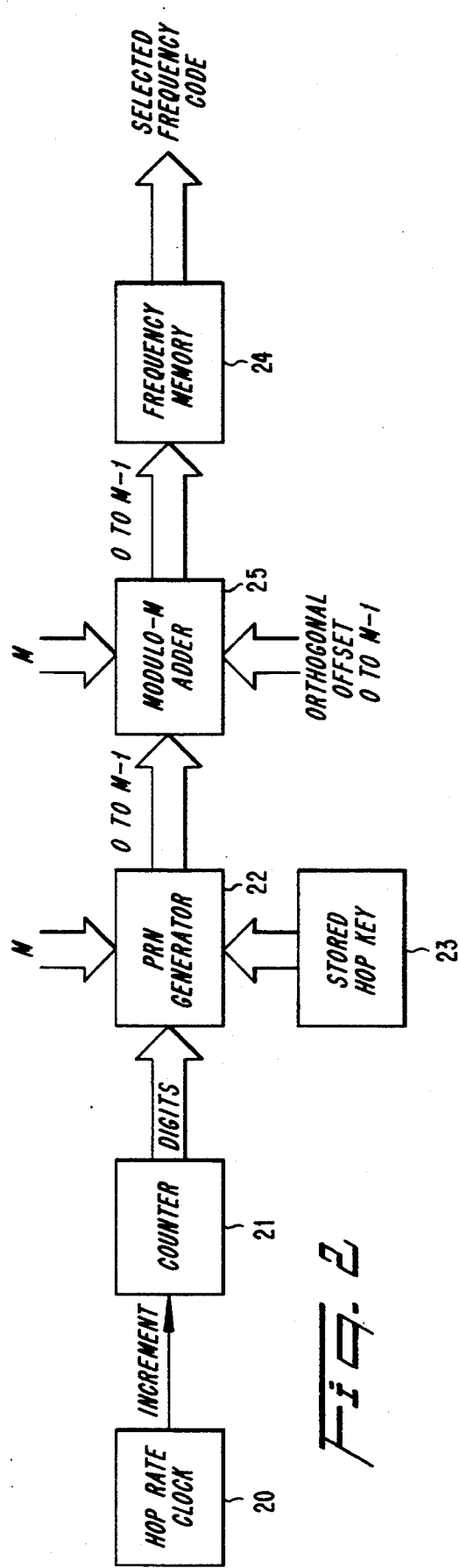
FIG. 2 illustrates an exemplary orthogonal sequence generator.

FIG. 2 shows an exemplary system for producing orthogonal pseudo-random sequences suitable for a cellular application. A counter 21 having any desired period or number radix is incremented by a hop-rate clock 20. After each increment, the digits of the counter are extracted and loaded into the internal registers of a pseudorandom number (PRN) generator 22. The digits of a stored number called the hop key 23 are also fed into the pseudorandom number generator 22. The PRN generator combines the digits of the hop key with the digits of the counter to produce a random number that depends in some way on all of the input digits. Because the counter digits change for each hop, the random number produced will change with each hop.

The random number is used to address a hopset memory 24 containing a list of available frequencies to which the mobile or base station is allowed to hop. The address is, however, first modified by adding the orthogonal offset in adder 25. Adder 25 operates modulo the number of frequencies M in the hopset memory 24. The random number and the orthogonal offsets are also constrained to the range 0 to M−1. Different mobile stations in the same cell have precisely the same counter arrangement, frequency list and hop key, but apply different orthogonal offsets. They all produce the same random number at the input of adder 25, but by virtue of having different offsets are guaranteed to address different frequencies in the memory 24.

For example, suppose for M=10 the list of frequencies in the memory is designated as follows in Table 1:

TABLE 1

| M | 0  | 1  | 2  | 3  | 4  | 5  | 6  | 7  | 8   | 9  |
|---|----|----|----|----|----|----|----|----|-----|----|
| f | f8 | f1 | f5 | f2 | f9 | f4 | f3 | f7 | f10 | f6 |

Further, at a given instant, the PRN generator 22 produces a number 4 which is in the range 0 to 9 consistent with a modulo-10 constraint. Then frequency 4 in the list, f9, will be selected by a mobile station having an orthogonal offset of 0, frequency 5 in the list, f4, will be selected by the mobile having the offset 1, and so on. The mobile having the offset 6 will select frequency 0 (f8) because 4+6=0 in modulo-10 arithmetic. This modulo-10 wraparound continues up to the mobile having the highest offset of 9, giving frequency number 4+9=3 or f2. All mobiles having unique orthogonal offsets thus select a unique frequency. In a cellular system, it may be of no consequence that the mobile having the orthogonal offset 5 always selects f4 when the mobile having the offset 4 selects f9, and so-on, but in military systems relying on orthogonal frequency hopping for transmission security such a fixed relationship is undesirable. This fixed relationship may be eliminated if so desired while still producing orthogonal sequences by means of the invention disclosed in the above incorporated U.S. Patent.

Stations in another cell can use the same frequency list but have a different hop key and so produce unrelated random sequences, any one of which has just a 1/M probability of producing the same frequency as a sequence in the first cell. If all orthogonal offsets are in use, however, all available frequencies will selected by at least one mobile station in the other cell, so interference with a mobile station in the first cell will exist. Since the frequency used by each mobile station changes on each hop, interference to the mobile station will always exist in a fully loaded system, but not always from the same mobile station in the other cell on each hop. This variation in the source of the interference is called interferer diversity, and has the benefit that the interference is sometimes from a nearby station and sometimes from a distant station, sometimes from a high power station and sometimes from a low power station, but not always from a worst case interferer. Thus, by suitable interleaving and coding over several hops to average out bursts of errors occurring in a single bad hop, it is only necessary to design the system for the mean interference level rather than the worst case interference level, allowing an increase in capacity when compared to fixed frequency systems.

Figures 3A, 3B, 3C:
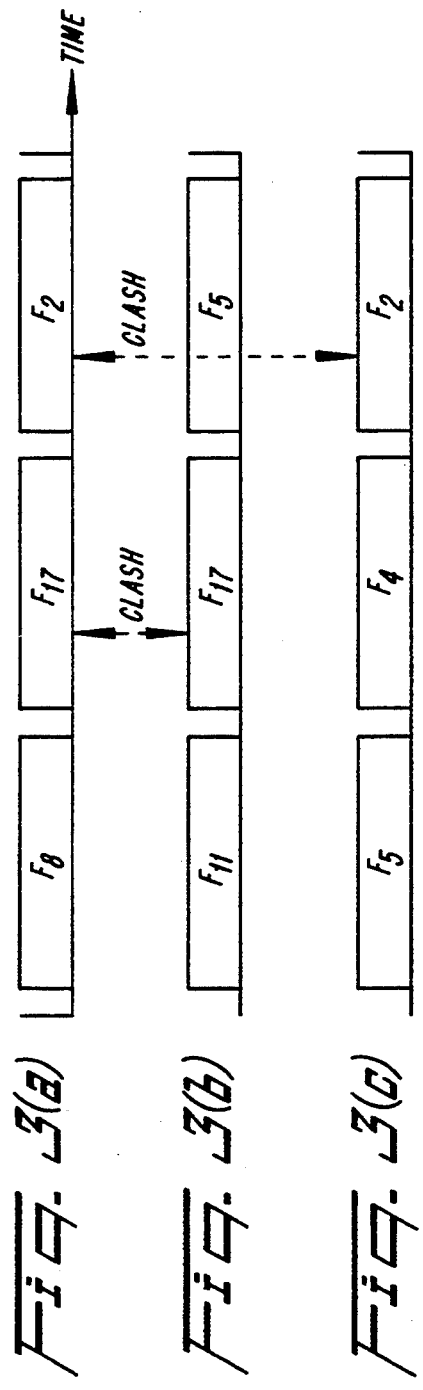
FIGS. 3(a)-3(c) show frequency hopping communication transmissions of three mobile stations.

FIGS. 3(a)-3(c) illustrate an example of how interference affects frequency hopped signals in a hypothetical fully synchronized network. FIG. 3(a) shows a sequence of frequencies selected by a given mobile station in a first cell and FIG. 3(b) shows a sequence of frequencies selected by the interfering station in a neighboring cell received with dominant signal strength by the mobile station in the first cell. FIG. 3(c) shows the sequence of frequencies selected by another interferer received at lower signal strength than the interferer of FIG. 3(b) by the mobile station in the first cell. It is assumed for the purpose of this example that the frequency hopping patterns are time-aligned as between adjacent cells, so that when frequency clashes occur their duration is for the entire hop.

It can be seen from FIGS. 3(a)-3(c) that the signal quality perceived by the given mobile consists of one whole "good" hop, where neither of the potential interferers are using the same frequency, one whole "bad" hop, where the strong interferer is using the same frequency, followed by one whole "medium quality" hop where the weaker interferer is using the same frequency. If coded information blocks are interleaved over two consecutive hops only, it can be seen that the coding might have to cope with half the symbols being "bad" and half being "medium". In the worst case scenario (not shown), two consecutive "bad" hops could conceivably arise, and the coding might not be able to compensate in which case information is lost. If, on the other hand, coded information blocks were interleaved over three consecutive hops, then a coded block would, in the example of FIGS. 3(a)–3(c), consist of one-third "good" symbols, one-third "bad" symbols and one-third "medium" symbols. The average symbol quality in this case is higher, making it easier for the error-correction decoding to correct errors. To obtain more even block quality statistics, much more interleaving than three hops would be desirable. Using conventional techniques however, increasing interleaving depth to obtain more interferer diversity causes an unacceptable increase in system delay.

However, according to exemplary embodiments of the present invention, better statistical averaging of symbol quality is achieved through more interferer diversity, without increasing the system delay. This is achieved by arranging neighboring base stations to change frequency (hop) at times that are systematically offset from each other. This deliberate timing offset between base stations results in the frequency hopping interference situations as illustrated by the exemplary transmissions of FIGS. 4(a)–4(e).

Before describing FIGS. 4(a)–4(e), it should be noted that FIG. 3 is a simplified picture of interference situations showing, for the purpose of illustration only, two interferers. There are of course an almost infinite number of interferers on every frequency, and thus in reality every hop experiences a non-zero level of interference. Because most interferers are long distance however, their interference levels are negligible, justifying simplification of FIG. 3 to include "good" hops with no interferers. FIG. 3 is simply intended to illustrate the broad concept that, in a fully synchronized network, only three different interference situations can arise in the space of three frequency hops.

FIGS. 4(a)–4(e) illustrate a situation according to the present invention where two neighboring cells are considered, and these have deliberate timing offsets of one-third of a hop, hereinafter termed a hop segment, relative to each other. The picture is again simplified in that an almost infinite number of interferers can be shown, but two interferers in each of two cells are shown for simplicity. Denoting by $I_{jk}$ the jth interferer in the kth cell, it can be seen that the wanted signal is disturbed as follows in Table 2.

TABLE 2

| Hop Segment | Interferers |
|---|---|
| 0–2 | $I_{23}$ |
| 2–4 | None |
| 4–6 | $I_{21}$ |
| 6–7 | None |
| 7–8 | $I_{22}$ |
| 8–9 | $I_{22}$ & $I_{23}$ |

From Table 2 it can be seen that in the space of three hops, five different interference situations have arisen. Thus, the amount of interferer diversity has been increased compared to the previously-described, hypothetical fully synchronized system, which only experiences the same number of different interference situations in a given time interval as the number of hops contained in that time interval. In fact, had more interferers been illustrated in FIGS. 4(a)–(e), it would have become clear that the number of different interference situations arising in the space of three hops was nine, because of the one-third hop timing stagger.

A more general understanding of the mechanism of interferer diversity according to an exemplary embodiment of the present invention can be gained by considering a fully loaded system, in which every available frequency is simultaneously in use by one mobile in every cell. Then the interference in the first one-third of a hop is the sum of the interference from one mobile in every cell. This can be partitioned into a set S1 of mobiles in cells that will change frequency at the end of the first one-third hop, plus a set S2 of mobiles that will change frequency at the end of the second one-third hop. The second one-third is then interfered with by the same set S2 again but S1 has changed to a new set S3. The third one-third hop will be interfered with by S3 again but S2 will have changed to a new set S4. Thus the three one-third hop segments of the wanted signal can be considered to be disturbed by S1+S2, S2+S3, and S3+S4, respectively. Although the three interference situations are not totally uncorrelated, at least half of the interference is different between each one-third hop. Moreover, interference attributable to a common set may have changed due to Rayleigh fading relative to the interference caused by that same set in a previous one-third hop segment, if the hop period is more than a few milliseconds.

The number of effectively different interference situations becomes less pronounced when the number of timing staggers available to allocate to surrounding cells is increased. For example, if seven timing staggers were provided, the interference in each of the seven one-seventh hops of a wanted signal would then be from sets of mobiles as shown in Table 3 below:

TABLE 3

| Hop Segment | Interferers |
|---|---|
| 1 | S1 + S2 + S3 + S4 + S5 + S6 |
| 2 | S2 + S3 + S4 + S5 + S6 + S7 |
| 3 | S3 + S4 + S5 + S6 + S7 + S8 |
| 4 | S4 + S5 + S6 + S7 + S8 + S9 |
| 5 | S5 + S6 + S7 + S8 + S9 + S10 |
| 6 | S6 + S7 + S8 + S9 + S10 + S11 |
| 7 | S7 + S8 + S9 + S10 + S11 + S12 |

It is seen that five out of six of the interferers are the same in adjacent one-seventh hop segments, so the adjacent-in-time interference situations comprise, on a percentage basis, much less variation than that presented in the previous three segment example. Moreover, the time difference between adjacent segments is reduced to one-seventh of a hop so that Rayleigh fading may not alter the effect of the common part to an appreciable degree unless the hop period is relatively large. Thus, depending on the design situation, it can be preferable to use a relatively small number of available staggered timings, however, the present invention is intended to encompass all numbers of staggered timings.

According to an exemplary embodiment consistent with the foregoing discussion, it is desired to allocate three timing staggers to cells of a communication system such that the closest cells do not use the same timing as each other. This is analogous to frequency allocation in fixed frequency cellular systems and methods for frequency planning are well known. Thus other types of stagger or offset allocation could readily be implemented based on traffic considerations. The present invention encompasses all types of deliberate planning of timing offsets.

A fragment of a 3-cell plan for a 3-stagger system is shown in FIG. 5. Therein, cells denoted to hop with a relative offset of zero, cells denoted $t_1$ hop with an offset of one-third of a hop period and cells denoted $t_2$ hop with an offset of two-thirds of a hop period.

Figure 6:
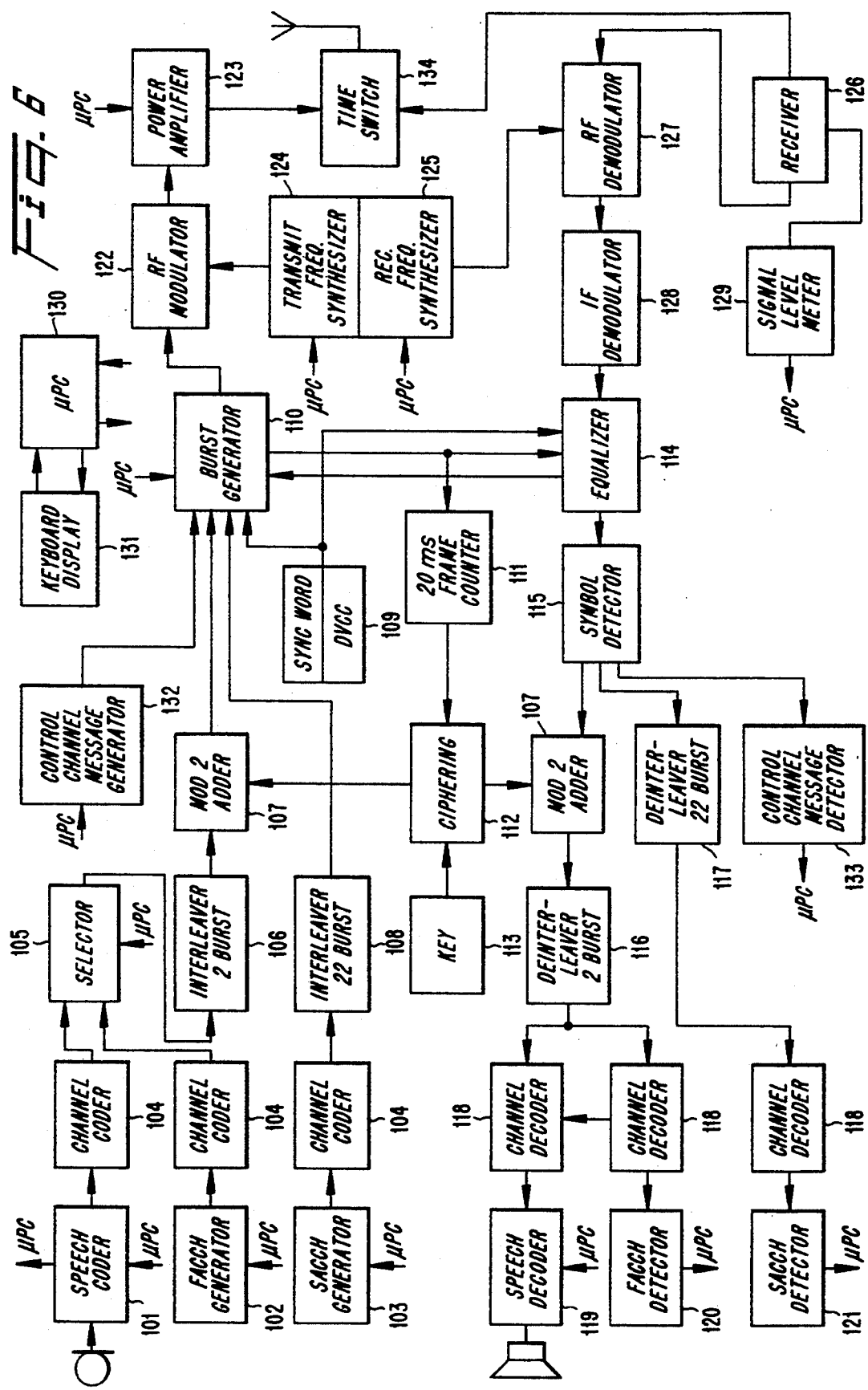
FIG. 6 is a block diagram of a mobile station according to an exemplary embodiment.
Figure 7:
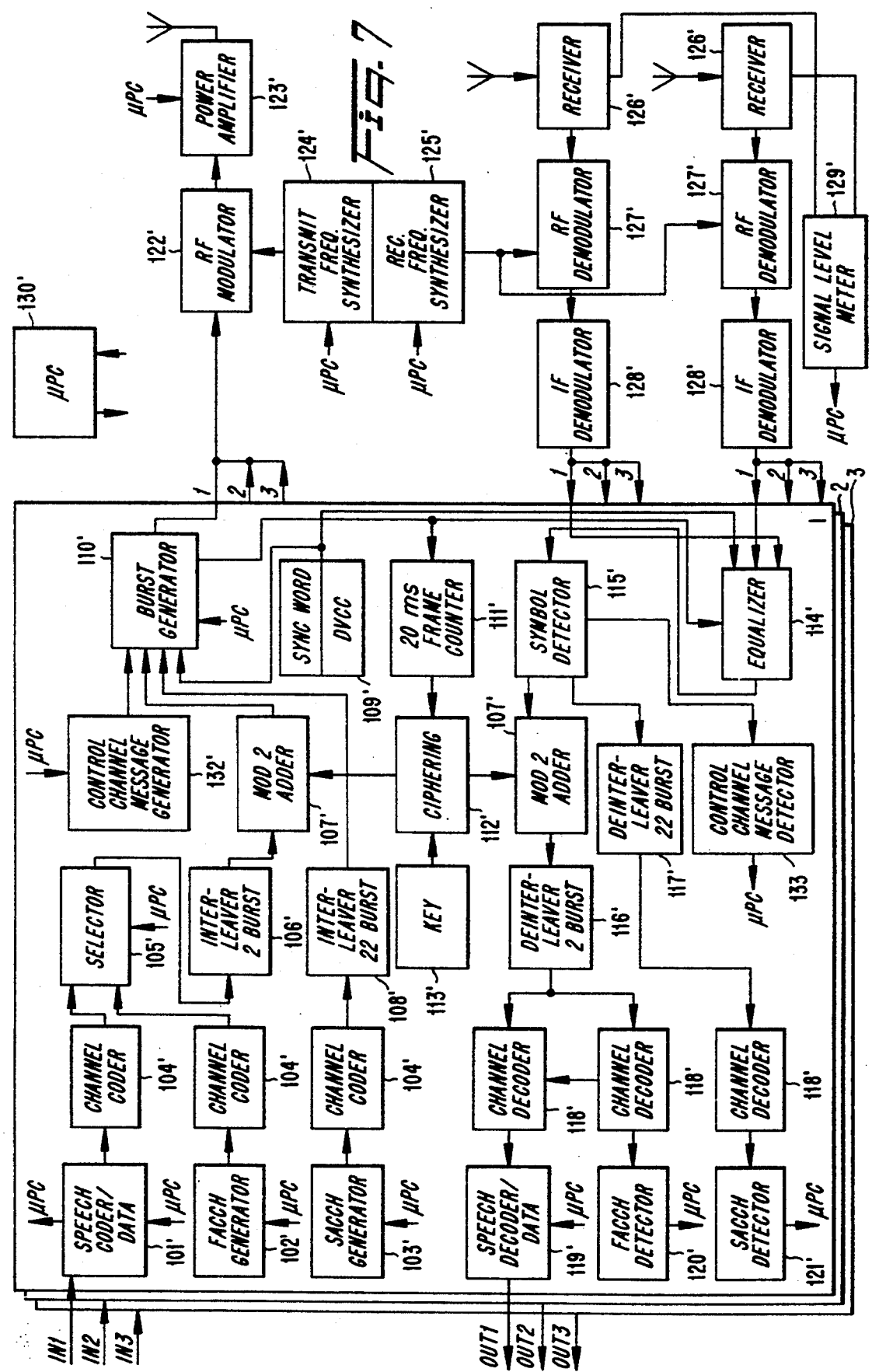
FIG. 7 is a block diagram of a base station according to an exemplary embodiment.

Although the foregoing discussion relates to an exemplary FH-FDMA system according to the present invention, the present invention is also applicable to TDMA systems. FIGS. 6 and 7 are block diagrams of exemplary embodiments of a mobile station and a base station, respectively, for communication on TDMA radio channels in a cellular mobile radio system. The base and mobile stations depicted therein are designed for a system according to EIA/TIA IS-54 standards but also for transmission according to the invention in a TDMA system without analog traffic channels. Since communication on analog control channels may be done substantially according to standard practices and the present invention relates to hopping between digital traffic channels, the part of the base and mobile stations used only for analog control channels and analog traffic channels according to EIA/TIA IS-54 are not illustrated.

Normally a base station is designed for serving many mobiles, i.e., updating/monitoring and handling connections involving many mobile stations. However, to make a more intelligible drawing, FIG. 7 only illustrates those parts of a base station for handling three simultaneous connections in different time slots. Thus, for example, the base station has only three channel controllers 1, 2, and 3, each of which handles one of three connections. Furthermore, the base station has only one RF modulator and power amplifier receiving bursts from the channel controllers. Normally a base station would have many RF modulators and power amplifiers, each modulator receiving bursts from up to as many channel controllers as they are time slots in a frame.

In FIG. 7, the block of the base station controller corresponding to similar mobile station blocks in FIG. 6 are assigned the same reference number, but with an apostrophe. A very brief description of the purpose or operation of each block according to EIA/TIA IS-54 standards will be given first. Corresponding blocks in the base station are assumed to have similar purpose and operation unless otherwise noted.

A speech coder 101 in the mobile station converts the analog signal generated by a microphone subjected to the human voice, or data received from a data source (not illustrated), into a bit data stream. This data stream is then divided into data packages according to the TDMA principle. The speech/data coder 101' in the base station converts incoming digital information into data packages of the same type as the speech coder 101 in the mobile station According to the EIS/TIA IS-54 standards there is a fast associated control channel, FACCH, and a slow associated control channel, SACCH. The FACCH generator 102' in the base station is used during the signaling of control and supervision messages to the mobile station. When preparing a handoff, the base station can transmit time slot hopping information on a FACCH radio channel, e.g., similar to GSM or the identity of a hopping scheme, to be used by the mobile station for its connection after handoff. The FACCH generator 102 in the mobile is used by the mobile during the signaling of control and supervision messages. A FACCH message transmitted by a base or mobile in a time slot of a frame replaces the speech or data from that base or mobile in that frame.

The SACCH is a continuous control channel, meaning that a fixed number of bits (e.g., 12) is reserved for the SACCH in each burst relating to a connection. The SACCH generator 103' in the base station is used by the base when exchanging signaling messages with the mobile. Before a handoff, the base can transmit hopping information on the SACCH, e.g., according to GSM or the identity of a radio channel and time slot hopping scheme, to be used by the mobile for the connection after handoff. SACCH generator 103 in the mobile station is used by the mobile when exchanging signaling messages with the base.

There is a channel coder 104 and 104' connected to each of blocks 101–103, and 101' to 103', respectively. A channel coder manipulates the incoming data to make error detection and correction possible. The mechanisms used are convolutional encoding for protecting important data bits in the speech code, and cyclic redundancy check (CRC) where the perceptually significant bits in the speech coder frame, e.g., 12 bits, are used for computing a 7-bit check.

A selector 105 is connected to the channel decoder 104 associated with the speech coder 101 and FACCH generator 102. The selector 105 is controlled by the microprocessor controller 130 so that, at appropriate times, user information over a particular connection is replaced with messages over the FACCH.

The two burst interleaver 106 interleaves data either from the speech coder 101 or from the FACCH generator 102 over two time slots. The 260 data bits which constitute one transmitting word, are divided into two equal parts and allotted two consecutive time slots. The effects of Rayleigh fading will be reduced in this way.

The output of the two burst interleaver 106 is connected to the input of rood 2 adder 107 so that transmitted data is ciphered, bit by bit, by logical modulo-two-addition of a pseudo-random bit-stream delivered by ciphering circuit 112.

Data transmitted over the SACCH is interleaved by the interleaver 22 burst 106 over 22 time slots, each consisting of 12 bits of information. Two SACCH messages are interleaved in parallel, i.e., the second message is delayed 11 bursts compared to the first, according to the diagonal principle.

Sync word/DVCC memory 109 is a storage device for sync words and digital verification color codes, DVCC. A 28-bit synchronization word is used for time slot synchronization and identification and also for equalizer training.

Different slot identifiers are defined, one for each time slot, and another three are reserved for future development. The DVCC is a 8-bit code which is sent by the base to the mobile and vice-versa. The DVCC is used for assuring that the right radio channel is decoded.

Depending on the state of operation, two kinds of bursts are generated by the base station burst generator 110'. The voice/traffic channel burst is configured by integrating 260 bits DATA, 12 bits SACCH, 28 bits SYNC, 12 bits Coded DVCC and 12 delimiter bits according to the time slot format specified by EIA/TIA IS-54, except that the 12 delimiter bits are used, according to exemplary embodiments of the present invention for power up/down ramping between frequency hops since it is not desirable to switch frequency with the transmitter at full power. In a control channel burst, DATA and SACCH are replaced with data generated by the control channel message generator 132'. The transmission of a burst in a time slot of a radio channel is synchronized with the transmission of bursts in the other two time slots, if any.

Depending on the state of operation, two kinds of bursts are generated by the mobile station burst generator 110. The voice/traffic channel burst is configured by integrating 260 bits DATA, 12 bits SACCH, 28 bits SYNC, 12 bits Coded DVCC and 12 bit periods of power up/down ramping.

Three full rate time slots make up one frame. The 20 mS frame counter 111 updates the ciphering code every 20 ms, i.e., once for every transmitted frame. A pseudo random algorithm is used for ciphering. The ciphering circuit 112 is controlled by a key which is unique for each subscriber. Key unit 113 comprises a sequencer for updating the ciphering code.

In order to cope with multipath propagation and other difficulties which cause time dispersion, an adaptive equalization method is provided by the equalizer 114' in the base station to improve signal quality. Synchronization with the burst generator 110' is provided to find the time slot associated with the right received channel. A correlation performed in the equalizer adjusts to the timing of the received bit stream. The sync word and DVCC are checked for identification reasons.

The mobile station also has an equalizer 114, for providing an adaptive equalization method to improve signal quality. A correlation performed in the equalizer adjusts to the timing of the received bit stream. The base station is the master and the mobile station is the slave regarding frame timing. The mobile station equalizer finds the incoming timing and synchronizes the burst generator. The sync word and DVCC are again checked for identification reasons.

The RF modulator 122 modulates the carrier frequency from the transmitting frequency synthesizer 124 according to the $\pi/4$-D-QPSK method ($\pi/4$ shifted, Differentially encoded Quadrature Phase Shift Keying). This technique implies that information is differentially encoded, i.e., 2 bit symbols are transmitted as four possible changes in phase: $\pm \pi/4$ and $\pm \pi/4$.

The power amplifier 123 amplifies the signals from the RF modulator 122. The RF power emission level is selected on command by the micro processor controller 130.

The transmitting frequency synthesizer 124' in the base station generates the transmitter carrier frequency in accordance with commands from the microprocessor 130'. When radio channel hopping is implemented, the microprocessor 130' calculates or reads which radio channel is to be used for each burst in accordance with hopping information stored in a microprocessor memory (not shown) and the hopping information is transmitted to the mobile station intended to receive the burst. The microprocessor 130' then sends timed instructions to the transmitter frequency synthesizer 124' to generate a sequence of carrier frequencies in accordance with the frequency hopping sequence or scheme to be used.

The transmitting frequency synthesizer 124 in the mobile station generates the transmitter carrier frequency in accordance with commands from the microprocessor 130. When radio channel hopping is implemented, the microprocessor 130 reads or calculates a sequence of radio channels to be used in accordance with the selected radio channel time slot hopping information received from the base station on either the control channel during call setup or on one of the associated control channels during a handoff. The microprocessor 130 sends timed commands regarding the desired radio channel to the synthesizer 124.

The receiving frequency synthesizer 125', in the base station generates the receiver carder frequency in accordance with commands from the microprocessor 130'. The microprocessor determines which receiver carrier is to be used for which time slot in accordance with hopping information stored in a microprocessor memory (not shown), e.g., according to a radio channel time slot hopping scheme, and sends timed instructions to the synthesizer 125'.

In the mobile station the receiving frequency synthesizer 125 generates the receiver carrier frequency in accordance with the instructions from the microprocessor 130. The appropriate radio channel is read or calculated by microprocessor 130 in accordance with a radio channel time slot hopping scheme or other hopping information received from the base station on either the control channel during call setup or on one of the associated control channels during a handoff.

Radio signals from antennas are received by receiver 126 in the mobile station and a separate receiver 126' for each antenna in the base station. The radio frequency carrier from a receiver is demodulated in a RF demodulator 127 or 127', by generating an intermediate frequency. In the IF demodulator 128 the intermediate frequency signal is demodulated, restoring the original $\pi/4$-DQPSK-modulated digital information. The received signal strength is measured by the signal level meter 129 and the value is sent to the microprocessor controller 130.

The symbol detector 115 converts the received 2-bit symbol format from the equalizer 114 into a single bit data stream. The two-burst deinterleaver 116 reconstructs the speech/FACCH data from the mod 2 adder 107 by assembling and rearranging information from two consecutive frames. SACCH data, which is spread over twenty-two consecutive frames, is reassembled and rearranged by the twenty-two burst deinterleaver 117.

The convolutionally encoded data from a deinterleaver is decoded by channel decoder 118 using the reverse of the principle used to encode the data. The received cyclic redundancy check (CRC) bits are checked to determine if any error has occurred. The channel decoder 118 for the FACCH furthermore detects the distinction between speech channel and FACCH information and directs the decoders accordingly.

The speech decoder 119 processes the received data in accordance with the speech coder algorithm, for example VSELP, and generates the received speech signal. The analog signal is finally enhanced by filtering techniques. The FACCH detector 120 detects messages on the fast associated control channel and transfers the information to the microprocessor controller 130. During a handoff, the mobile station can receive the identity of the hopping patterns to be used in the next connection on this channel.

Messages on the Slow Associated Control Channel are detected by the SACCH detector 121 and the information is transferred to the microprocessor controller 130. During a handoff the mobile station can receive on this channel, the identity of the shifting schemes to be used in the next connection.

The radio base station activity and the mobile station communication is controlled by the microprocessor controller 130' in the base station. Decisions are made in accordance with received messages and measurements made. When hopping is implemented, a sequence of combinations of a radio channel and a time slot channel shifting schemes are determined for each of the transmission directions for each mobile station served and involved in a connection.

The mobile station activity and the base station communication are controlled by the mobile station microprocessor controller 130, which also handles the terminal keyboard display 131 input and output. Decisions are made in accordance with received messages and measurements made. For each timeslot, the transmitter and receiver radio channels will be determined according to the hopping information received and information stored in the microprocessor memory (not shown). The mobile station keyboard display 131 performs the information exchange between the user and the base station.

Control channel message generator 132 generates control channel messages according to orders received from the microprocessor 130. The control channel message detector 133 detects received control channel messages and sends them to the microprocessor controller 130.

The time switch 134 in the mobile station connects either the transmitter or the receiver to the mobile station antenna. The timing is synchronized to the receiving and transmitting sequence by the microprocessor controller 130.

In FH-TDMA systems as, for example, those including mobile and base stations similar to those exemplary stations previously described in which dwell periods on a given frequency are divided into time slots that are allocated to different mobile stations, the timing stagger provided according to the present invention can be a fraction of the time slot period rather than the total dwell period, as shown in FIGS. 8(a)-8(c). FIG. 8(a) illustrates a 3-slot FH-TDMA system but for simplicity shows activity only for a single wanted signal belonging to a mobile station which has been allocated one of the three time slots.

The wanted signal shown in FIG. 8(a) uses timeslot 1. In the first example of timeslot 1, the frequency used in the frame is f1. Three time slots later, the wanted signal's turn for transmission comes around again, but this time the frame frequency is f2.

The FH-TDMA frame illustrated in FIG. 8(b) shows the staggered timing used in a first interfering base station. Again, only one signal is being illustrated here, that signal having dwelt on frequency f6 in the previous frame and f1 in this frame, showing an overlap with the last two-thirds of the wanted signal's TDMA burst. In a fully loaded system, of course, another signal in this base station would have used f1 in the previous frame, overlapping with the first one-third of the wanted signal's burst.

The FH-TDMA frame illustrated in FIG. 8(c) belongs to a second interfering base station having the third timing stagger. The illustrated signal in this case is that which used f1 in the previous frame, overlapping the first two-thirds of the wanted signal's burst. Thus all three one-third segments of the wanted signal burst are interfered with by somewhat different combinations of interferers, providing the desired increased interferer diversity. As discussed above, increased interferer diversity essentially condenses the distribution of the magnitudes of different interference situations around the mean, which resultingly lowers the interference of a worst case outlier. This in turn increases system capacity, since system designers can rely on a better interference threshold.

FIGS. 8(a)-(c) also indicate a preferred placement of known symbol patterns, known as sync words and used for synchronization purposes in each burst, so that they coincide with the inter-hop guard periods of the interferers. The receiver correlates received signals with the known sync words both to provide received signal timing information and estimates of the channel impulse response. This information can then be used to determine the operation of an equalizer to compensate for echoes in the radio channel. Since these correlation results affect how an entire block of information symbols is processed, it can be more important to arrange a lower interference environment for the sync words than for a few data symbols.

Thus, according to the foregoing exemplary FH-TDMA system according to the present invention, the sync words of one signal are overlapped by the sync words of another signal. Therefore, the interference to the sync words of one signal does not consist of unknown data but of known symbols. It is then possible to eliminate a large part of the interference to sync words by means of, for example, a joint estimation or correlation process and/or intelligent allocation of sync words to cells in an appropriate re-use pattern.

For example, in FIGS. 8(a)-(c) where sync word bursts are indicated by cross-hatching it can be seen that the interference to the first sync word of the wanted signal arises only from those stations having a two-thirds hop delay and those which have the same timing offset and are separated by the 3-cell re-use distance (e.g., other cells designated similarly in FIG. 5 as the cell containing wanted signal). Those having the same timing can be arranged to use orthogonal sync words. For example, if the sync words are 8 bits long, seven orthogonal words can be constructed and deployed in a 7 (x3) cell pattern so that the repetition of the same sync word with the same timing stagger occurs only after a 21-cell re-use distance.

Cells having a relative timing stagger can then use sync words that are not orthogonal to the first set, but nevertheless have as many different bits as possible. Sets of sync words having such properties can be constructed, for example, using the method disclosed in U.S. patent application Ser. No. 07/866,865, entitled "Multiple Access Coding for Mobile Radio Communications" and filed on Apr. 10, 1992, which is hereby incorporated by reference.

To take advantage of the improved interferer diversity provided by the present invention, another exemplary embodiment of the present invention will now be described. As mentioned above, it is desirable to interleave coded symbols over as many one-third hop segments as possible without unduly increasing the delay caused thereby. If three hops' worth of interleaving delay can be tolerated, a convenient interleaving pattern can be constructed as follows.

Divide each hop's data symbols for transmission into nine portions. For example, three such block could be divided as:

Block 1

| $P_{11}$ | $P_{12}$ | $P_{13}$ | $P_{14}$ | $P_{15}$ | $P_{16}$ | $P_{17}$ | $P_{18}$ | $P_{19}$ |

Block 2

| $P_{21}$ | $P_{22}$ | $P_{23}$ | $P_{24}$ | $P_{25}$ | $P_{26}$ | $P_{27}$ | $P_{28}$ | $P_{29}$ |
|---|---|---|---|---|---|---|---|---|

Block 3

| $P_{31}$ | $P_{32}$ | $P_{33}$ | $P_{34}$ | $P_{35}$ | $P_{36}$ | $P_{37}$ | $P_{38}$ | $P_{39}$ |
|---|---|---|---|---|---|---|---|---|

Then, transmission of these portions can be interleaved such that each block is transmitted over parts of three hops, wherein each hop has three one-third segments. An exemplary interleave is summarized below wherein hop segments 1–9 comprise the nine hop segments of hops 3, 4, and 5. As can be seen, all of data block 3 is transmitted over hops 3, 4, and 5, as well as parts of data blocks 1, 2, 4, and 5.

TABLE 4

| Hop Segment | Portions Transmitted |
|---|---|
| | Hop 3 |
| 1 | $P_{13}$, $P_{22}$, $P_{31}$ |
| 2 | $P_{16}$, $P_{25}$, $P_{34}$ |
| 3 | $P_{19}$, $P_{28}$, $P_{37}$ |
| | Hop 4 |
| 4 | $P_{23}$, $P_{32}$, $P_{41}$ |
| 5 | $P_{26}$, $P_{35}$, $P_{44}$ |
| 6 | $P_{29}$, $P_{38}$, $P_{47}$ |
| | Hop 5 |
| 7 | $P_{33}$, $P_{42}$, $P_{51}$ |
| 8 | $P_{36}$, $P_{45}$, $P_{54}$ |
| 9 | $P_{39}$, $P_{48}$, $P_{57}$ |

The nine portions of each data block are thus distributed over the nine, one-third hop segments of three hops. Of course the partitioning of each data block into nine portions can be done in any desired manner and need not be performed according to the example given above. Thus, for example, the symbols allocated to the nine portions might not be adjacent symbols in the data block, but rather can be chosen from scattered locations so as to give the best dispersion of symbol errors occurring as a result of one bad one-third hop segment. Moreover, the data blocks can be interleaved over more or less than three hops depending on the amount of delay which is generated thereby and whether such delay is tolerable. Further, the data blocks can be divided into any number of portions depending on the number of offsets or staggers used within each hop and the number of hops over which interleaving is desired.

It should be mentioned that cellular systems often employ illumination of a group of three cells from their common juncture, instead of from their centers, in order to save on equipment sites and therefore real estate costs. This method of illumination, sometimes known as sectorization, does not materially alter the principle of staggered timing applied to frequency hopping systems, but there exists the option either to consider each illuminated sector as a cell in a timing re-use pattern, or to apply the timing re-use pattern to the sites.

Since a common network structure used in existing FDMA cellular systems consists of three sectors per site times 7-site re-use, effectively a form of 21-cell re-use pattern, such common networks can be readily adapted to implement the aforementioned exemplary embodiment in which timing staggers are allocated according to a 3-sector re-use pattern while orthogonal sync words are allocated according to a 7-site re-use pattern.

While the present invention has been described with respect to the foregoing exemplary embodiments, these embodiments are intended to be in all respects illustrative rather than limitive or restrictive of the present invention. Any and all modifications or changes which are within the spirit and scope of the present invention as embodied by the appended claims are intended to be encompassed thereby. Thus, for example, although the present invention has been described in terms of FDMA and TDMA systems, those skilled in the art will understand that the present invention could also be applied to CDMA systems wherein the CDMA carder is to be hopped.

What is claimed is:

1. A method for radio communications between a plurality of base stations and a plurality of mobile stations in a cellular radio telephone system comprising the steps of:
   varying a frequency used for each mobile-base communication link at regular intervals according to a pseudorandom pattern, such that each mobile station communicating with a base station in a given cell changes frequency at the same time; and
   varying frequencies used by mobile stations in surrounding cells at offset times, wherein such offset times are a function of cell position relative to said given cell.

2. A method according to claim 1 wherein said function of cell position comprises a regular re-use pattern.

3. A method according to claim 1 wherein said function of cell position is a 3-cell re-use pattern and the offset times are fractions of the regular intervals.

4. A method according to claim 1 further comprising the step of:
   selecting different frequencies for mobile stations in said given cell at said regular intervals.

5. A method according to claim 1 wherein said varying steps further comprise the steps of:
   applying a clock pulse to a pseudorandom number generator employing a multi-digit hop-key variable;
   extracting a pseudorandom number and using it as an address to a table of predetermined frequency values; and
   selecting a frequency value stored at said address and using said frequency to determine a transmission or reception frequency.

6. A method according to claim 4 wherein said step of selecting different frequencies further comprises the steps of:
   applying a clock pulse to a pseudorandom number generator employing a multi-digit hop-key variable;
   extracting a pseudorandom number between 0 and a maximum permitted value;
   adding said pseudorandom number to an orthogonal offset to obtain a sum and modulo-reducing the sum to be less than or equal to said maximum permitted value to generate a memory address; and
   using said memory address to select from a memory one of a number of stored frequency values and using said selected frequency value to determine a transmitter or receiver frequency.

7. A method for radio communications between a plurality of base stations and a plurality of mobile stations in a cellular radio telephone system using time division multiple access combined with frequency hopping comprising the steps of:

dividing TDMA frame periods into a number of time slots;

allocating the time slots in each frame period for communication between different mobile stations in a first group of mobile stations and a first base station;

varying a frequency for transmission or reception of the time slots in a frame period from frame period to frame period according to a pseudorandom pattern; and offsetting TDMA frame periods used by surrounding base stations in time by a number of fractions of a time slot that is a function of base station position relative to said first base station.

8. A method according to claim 7 in which said function of position constitutes a regular re-use pattern.

9. A method according to claim 7 in which said function of position is a 3-cell re-use pattern.

10. A method according to claim 7 in which further groups of mobile stations also communicate with said first base station using the same time slots but different frequencies.

11. A method according to claim 10 in which said different frequencies are also pseudorandomly varying such that no two mobile stations in communication with the same base station use the same frequency at the same time.

12. A method according to claim 11 in which said pseudorandom frequency variation is accomplished by means of:

applying a clock pulse every TDMA frame period to a pseudorandom number generator employing a multi-digit hop-key variable;

extracting a pseudorandom number between 0 and a maximum permitted value;

adding said pseudorandom number to an orthogonal offset and modulo-reducing a sum to be less than or equal to said maximum permitted value to obtain a memory address; and using said memory address to select from a memory one of a number of stored frequency values and using the selected frequency value to determine a transmitter or receiver frequency.

13. A method for radio communications between a plurality of base stations and a plurality of mobile stations in a cellular radio telephone system comprising the steps of:

encoding speech signals, using an error-correcting code, into blocks of data symbols for transmission;

dispersing said blocks of symbols over a number of hops for transmission and including at least one known symbol pattern in each hop and a number of guard symbols at a beginning and end of each hop;

selecting frequencies sequentially for each hop according to a pseudorandom sequence;

transmitting said hops sequentially between a mobile station and a base station by smoothly increasing a transmit power from zero while said guard symbols at the beginning of a hop are transmitted and smoothly reducing the transmit power to zero while said guard symbols at the end of a hop are transmitted to form a guard period of zero transmission between hops; and selecting timing offsets between base stations in different cells such that said guard periods of transmissions in a first cell coincide with transmissions of said at least one known symbol pattern in a second cell.

14. A system for radio communications between a plurality of base stations and a plurality of mobile stations comprising:

means for varying a frequency used for each mobile-base communication link at regular intervals according to a pseudorandom pattern, such that each mobile station communicating with a base station in a given cell changes frequency at the same time; and means for varying frequencies used by mobile stations in surrounding cells at offset times, wherein said offset times are a function of cell position relative to said given cell.

15. The system according to claim 14 wherein said function of cell position comprises a regular re-use pattern and the offset times are fractions of the regular intervals.

16. The system method according to claim 14 wherein said function of cell position is a 3-cell re-use pattern.

17. The system according to claim 14 further comprising:

means for selecting different frequencies for mobile stations in said given cell at said regular intervals.

18. The system according to claim 14 wherein said means for varying a frequency further comprises:

means for applying a clock pulse to a pseudorandom number generator employing a multi-digit hop-key variable;

means for extracting a pseudorandom number and using it as an address to a table of predetermined frequency values; and means for selecting a frequency value stored at said address and using said frequency to determine a transmission or reception frequency.

19. A system according to claim 17 wherein said means for selecting different frequencies further comprises:

means for applying a clock pulse to a pseudorandom number generator employing a multi-digit hop-key variable;

means for extracting a pseudorandom number between 0 and a maximum permitted value;

means for adding said pseudorandom number to an orthogonal offset to obtain a sum and modulo-reducing the sum to be less than or equal to said maximum permitted value to generate a memory address; and means for using said memory address to select from a memory one of a number of stored frequency values and using said selected frequency value to determine a transmitter or receiver frequency.

20. A system for radio communications between a plurality of base stations and a plurality of mobile stations in a cellular radio telephone system using time division multiple access combined with frequency hopping comprising:

means for dividing TDMA frame periods into a number of time slots;

means for allocating the time slots in each frame for communication between different mobile stations in a first group of mobile stations and a first base station; and means for varying a frequency for transmission or reception of the time slots in a frame period from frame period to frame period according to a pseudorandom pattern, wherein TDMA frame periods used by surrounding base stations are offset in time by a number of fractions of a time slot that is a function of base station position relative to said first base station.

21. A system according to claim 20 in which said function of position constitutes a regular re-use pattern.

22. A system according to claim 20 in which said function of position is a 3-cell re-use pattern.

23. A system according to claim 20 in which further groups of mobile stations also communicate with said first base station using the same time slots but different frequencies.

24. A system according to claim 23 further comprising:
means for pseudorandomly varying said different frequencies such that no two mobile stations in communication with the same base station use the same frequency at the same time.

25. A system according to claim 24 in which said means for pseudorandomly varying said different frequencies further comprises:
means for applying a clock pulse every TDMA frame period to a pseudorandom number generator employing a multi-digit hop-key variable;
means for extracting a pseudorandom number between 0 and a maximum permitted value;
means for adding said pseudorandom number to an orthogonal offset and modulo-reducing the sum to be less than or equal to said maximum permitted value to obtain a memory address; and
means for using said memory address to select from a memory one of a number of stored frequency values and using said selected frequency value to determine a transmitter or receiver frequency.

26. A system for radio communications between a plurality of base stations and a plurality of mobile stations in a cellular radio telephone system comprising:
means for encoding speech signals, using an error-correcting code, into blocks of data symbols for transmission;
means for dispersing said block of symbols over a number of hops for transmission and including at least one known symbol pattern in each hop and a number of guard symbols at the beginning and end of each hop;
means for selecting frequencies sequentially for each hop according to a pseudorandom sequence;
means for transmitting said hops sequentially between a mobile station and a base station by smoothly increasing a transmit power from :zero while said guard symbols at a beginning of a hop are transmitted and smoothly reducing the transmit power to zero while said guard symbols at the end of a hop are transmitted to form a guard period of zero transmission between hops; and
means for selecting timing offsets between the stations in different cells such that said inter-hop guard periods of transmissions in a first cell coincide with transmissions of said at least one known symbol pattern in a second cell.

* * * * *